United States Patent
Freeman et al.

(10) Patent No.: US 9,683,443 B2
(45) Date of Patent: Jun. 20, 2017

(54) METHOD FOR MAKING GAS TURBINE ENGINE CERAMIC MATRIX COMPOSITE AIRFOIL

(71) Applicant: Rolls-Royce North American Technologies, Inc., Indianapolis, IN (US)

(72) Inventors: Ted J. Freeman, Danville, IN (US); Richard C. Uskert, Timonium, MD (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 814 days.

(21) Appl. No.: 14/141,395

(22) Filed: Dec. 26, 2013

(65) Prior Publication Data

US 2015/0004000 A1    Jan. 1, 2015

Related U.S. Application Data

(60) Provisional application No. 61/772,261, filed on Mar. 4, 2013.

(51) Int. Cl.
| | | |
|---|---|---|
| *F01D 5/18* | (2006.01) | |
| *F01D 5/28* | (2006.01) | |
| *B23P 15/04* | (2006.01) | |
| *F01D 5/14* | (2006.01) | |

(52) U.S. Cl.
CPC .............. *F01D 5/186* (2013.01); *B23P 15/04* (2013.01); *F01D 5/147* (2013.01); *F01D 5/187* (2013.01); *F01D 5/282* (2013.01); *F05D 2230/10* (2013.01); *F05D 2230/50* (2013.01); *F05D 2240/122* (2013.01); *F05D 2240/304* (2013.01);

(Continued)

(58) Field of Classification Search
CPC .......... F01D 5/186; F01D 5/147; F01D 5/187; F01D 5/282; B23P 15/04; F05D 2240/122; F05D 2240/304; F05D 2300/6033; F05D 2230/10; F05D 2230/50
See application file for complete search history.

(56) References Cited

U.S. PATENT DOCUMENTS

| | | | |
|---|---|---|---|
| 4,434,835 A | * | 3/1984 | Willgoose ................. B22C 9/04 164/34 |
| 6,478,535 B1 | | 11/2002 | Chung et al. |

(Continued)

FOREIGN PATENT DOCUMENTS

EP     2500548 A1    9/2012

OTHER PUBLICATIONS

International Search Report and Written Opinion, International Application No. PCT/US2013/077893, Nov. 11, 2014, 10 pages.

*Primary Examiner* — Craig Kim
*Assistant Examiner* — Eldon Brockman
(74) *Attorney, Agent, or Firm* — Barnes & Thornburg LLP

(57) ABSTRACT

A method for making a gas turbine engine ceramic matrix composite airfoil is disclosed. The method includes fabricating an airfoil preform that has a slotted forward end and a continuous trailing end. The slotted forward end of the airfoil preform is coupled to an airfoil core insert. A ceramic matrix composite covering is applied to cover the slots of the airfoil perform. The continuous trailing end of the airfoil preform is removed to expose the slots. A gas turbine engine airfoil is also disclosed.

20 Claims, 4 Drawing Sheets

(52) U.S. Cl.
CPC . *F05D 2300/6033* (2013.01); *Y10T 29/49337* (2015.01)

(56) References Cited

U.S. PATENT DOCUMENTS

| | | | |
|---|---|---|---|
| 6,709,230 B2* | 3/2004 | Morrison | F01D 5/189 415/115 |
| 7,066,717 B2 | 6/2006 | Morrison et al. | |
| 7,093,359 B2 | 8/2006 | Morrison et al. | |
| 7,153,096 B2 | 12/2006 | Thompson et al. | |
| 7,255,535 B2* | 8/2007 | Albrecht | F01D 5/147 416/229 R |
| 7,316,539 B2* | 1/2008 | Campbell | F01D 5/146 244/123.1 |
| 7,435,058 B2 | 10/2008 | Campbell et al. | |
| 7,452,189 B2 | 11/2008 | Shi et al. | |
| 7,488,157 B2 | 2/2009 | Marini et al. | |
| 7,510,379 B2 | 3/2009 | Marusko et al. | |
| 7,837,438 B2* | 11/2010 | Campbell | F01D 5/146 415/191 |
| 2003/0059577 A1* | 3/2003 | Morrison | B32B 3/18 428/166 |
| 2003/0223861 A1* | 12/2003 | Morrison | F01D 5/189 415/115 |
| 2005/0238491 A1 | 10/2005 | Morrison et al. | |
| 2006/0226290 A1* | 10/2006 | Campbell | F01D 5/146 244/123.1 |
| 2006/0285973 A1* | 12/2006 | Keller | F01D 5/147 416/97 R |
| 2007/0140835 A1* | 6/2007 | Albrecht | F01D 5/147 415/115 |
| 2007/0172355 A1* | 7/2007 | Cunha | F01D 5/186 416/97 R |
| 2008/0017280 A1* | 1/2008 | Vargas | B23P 6/007 148/522 |
| 2008/0131285 A1* | 6/2008 | Albert | B22C 9/04 416/96 R |
| 2008/0203236 A1* | 8/2008 | Mazzola | F01D 5/147 244/35 R |
| 2009/0003988 A1* | 1/2009 | Campbell | F01D 5/146 415/115 |
| 2012/0279631 A1* | 11/2012 | Mizokami | B29C 70/30 156/60 |

\* cited by examiner

METHOD FOR MAKING GAS TURBINE ENGINE CERAMIC MATRIX COMPOSITE AIRFOIL

CROSS REFERENCE TO RELATED APPLICATIONS

This application claims priority to and the benefit of U.S. Provisional Patent Application No. 61/772,261, filed 4 Mar. 2013, the disclosure of which is now expressly incorporated herein by reference.

STATEMENT REGARDING FEDERALLY SPONSORED RESEARCH OR DEVELOPMENT

Embodiments of the present disclosure were made with United States government support under Contract No. FA8650-07-C-2803. The government may have certain rights.

TECHNICAL FIELD

The present application relates to methods for making gas turbine engine ceramic matrix composite airfoils, and more particularly, but not exclusively, to methods for incorporating breathing passages in gas turbine engine ceramic matrix composite airfoils.

BACKGROUND

Gas turbine engine ceramic matrix composite airfoils such as blades and vanes, and the manufacture of breathing passages in such ceramic matrix composite airfoils, remains an area of interest. Some existing systems and methods have various shortcomings, drawbacks, and disadvantages relative to certain applications. Accordingly, there remains a need for further contributions in this area of technology.

SUMMARY

One embodiment of the present application is a method for making a gas turbine engine ceramic matrix composite airfoil in which cooling passages are provided therein by covering a slotted perform with a ceramic matrix composite material and then removing a continuous trailing end of the slotted perform to expose a trailing end of the slots. Other embodiments include unique methods, systems, devices, and apparatus to provide for slotted cooling passages in a gas turbine engine ceramic matrix composite airfoil. Further embodiments, forms, objects, aspects, benefits, features, and advantages of the present application shall become apparent from the description and figures provided herewith.

BRIEF DESCRIPTION OF THE FIGURES

Features of the application will be better understood from the following detailed description when considered in reference to the accompanying drawings, in which.

DETAILED DESCRIPTION OF REPRESENTATIVE EMBODIMENTS

Figure 1A:
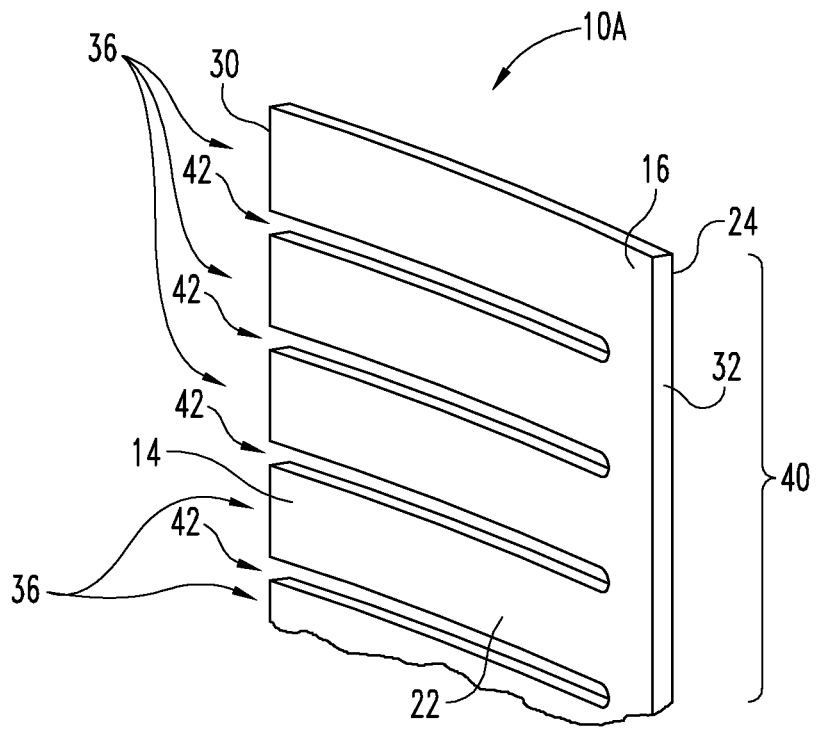
FIGS. 1A and 1B are partial perspective views of cooling channel preforms associated with a method for making a gas turbine engine ceramic matrix composite (CMC) airfoil according to an embodiment.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

A method for making a gas turbine engine ceramic matrix composite (CMC) airfoil having cooling passages therein according to an embodiment will now be described. The CMC airfoil can comprise any type of gas turbine engine airfoil, for example, a gas turbine engine blade or a gas turbine engine vane. As will be described herein with respect to one or more embodiments in greater detail below, various techniques can be used to form the cooling passages in the CMC airfoil, including for example the incorporation of various shapes, sizes, and curvature, in the CMC airfoil.

Figure 1B:
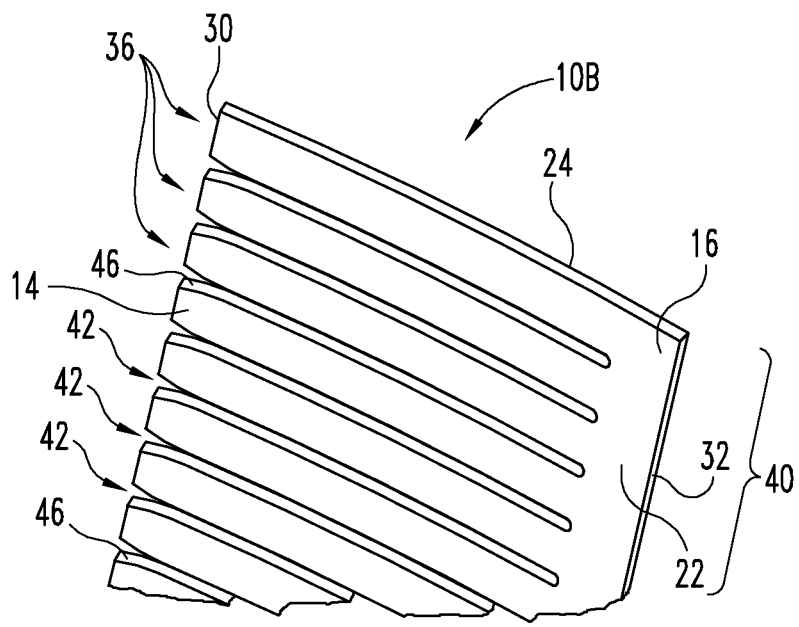
Figure 5:
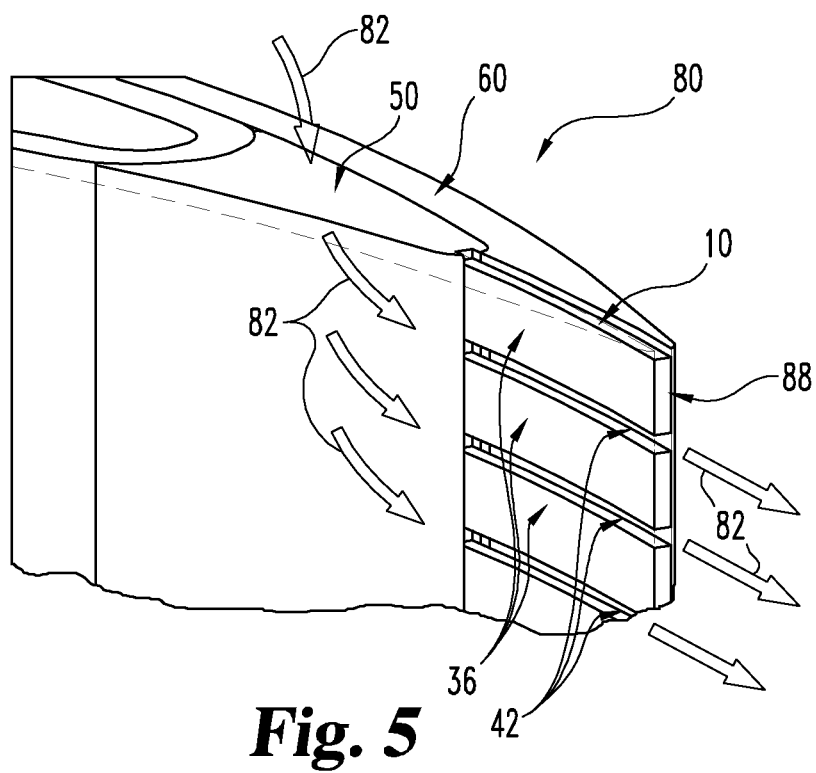
FIG. 5 is a partial perspective view of a finished CMC airfoil associated with the method.

Initially, a cooling channel preform 10 is manufactured. FIGS. 1A and 1B show two non-limiting examples of cooling channel preforms 10A, 10B according to an embodiment. As used herein, the reference numeral 10 refers to both the cooling channel preform 10A and the cooling channel preform 10B. The cooling channel preform 10 can be made of any suitable composite material, for example, a monolithic ceramic or a single ply or multiple ply rigidized ceramic matrix composite (CMC). The cooling channel preform 10 has a forward end 14, a trailing end 16, a lower surface 22, and an upper surface 24. As used herein, these descriptors correspond respectively to the forward end, the trailing end, the pressure side (lower surface), and the suction side (upper surface) of a finished CMC airfoil 80 such as shown in FIG. 5 that the cooling channel preform 10 and other airfoil components described herein ultimately form. Further, the forward end 14 has a forward edge 30 and the trailing end 16 has a trailing edge 32. The manner by which the cooling channel preform 10 is manufactured can be based on any number of factors. In one form, the cooling channel preform 10 is manufactured based on the particular temperature and pressure requirements of the finished CMC airfoil 80 in the gas turbine engine. Thus, the cooling channel preform 10 can be manufactured based on the mean camber line of the finished CMC airfoil 80, that is the line extending from the forward edge to the trailing edge of the finished CMA airfoil 80.

The cooling channel preform 10 includes a plurality of flow separator members 36 that extend perpendicularly from a continuous spanwise extending member 40 at the trailing end 16 of the cooling channel preform 10. In the illustrative embodiment, the flow separator members 36 are spaced apart in the spanwise direction by gaps, that is slots 42, therebetween that extend through the thickness of the cooling channel preform 10, that is from the upper surface 24 to the lower surface 22 of the cooling channel preform 10. In one form, the flow separator members 36 and associated slots 42 are formed in the fabrication process of the ceramic matrix composite (CMC) that forms the cooling channel preform 10. In another form, the slots 42 are formed by one or more suitable composite material removal techniques, for example, grinding, machining, electro-chemical erosion, and/or laser cutting; the technique leaving as a result the flow separator members 36 and the continuous spanwise extending member 40. The as-shown continuous spanwise extending member 40 has a linear trailing edge profile. In another form, the continuous spanwise extending member 40 can have a curved or otherwise nonlinear trailing edge profile, as will be appreciated.

In the FIG. 1A cooling channel preform 10A, the flow separator members 36 form slots 42 having a straight or linear configuration, while in the FIG. 1B cooling channel preform 10B, the flow separator members 36 form slots 42 having a linear configuration and a forward end taper 46. In the embodiment of both FIG. 1A and FIG. 1B, the slots 42 of the cooling channel preform 10 have the same size and are equally spaced apart in the spanwise direction, and each has a substantially uniform width. The slots 42 are open at the forward end 14, and closed at the trailing end 16 by way of the continuous spanwise extending member 40. In the illustrative embodiment, the slots 42 have a length in the chordwise direction that is greater than a length from a location at which the cooling channel preform 10 engages a below-described delivery member 50 to the trailing edge 88 of the finished CMC airfoil 80.

The cooling channel preform 10 is not limited to the configuration shown in FIGS. 1A and 1B, and other embodiments are contemplated. Thus, in one form, the flow separator members 36 of the cooling channel preform 10 can form a single slot 42 rather than multiple slots 42. In one form, the flow separator members 36 can form slots 42 that do not extend through the thickness of the cooling channel medium 10, but rather through only a portion of the thickness, so that the slots 42 are bordered by for example a lower wall between flow separator members 36. In one form, the flow separator members 36 can form slots 42 having a shape that is non-linear, for example, a curved or sinusoidal shape, or an irregular shape. In one form, one or more slots 42 can have a size that is different from that of one or more other slots 42. In one form, the slots 42 can be unequally spaced apart in the spanwise direction. In another form, one or more slots 42 can be equally spaced apart and one or more slots 42 can be unequally spaced apart. In one form, one or more slots 42 can have a non-uniform width, that is a width that changes from the forward end 14 to the trailing end 16 of the cooling channel preform 10. In one form, one or more slots 42 can be closed at the forward end 14 by way of a forward end continuous spanwise extending member. In one form, one or more slots 42 can branch off from another slot 42.

Figure 2:
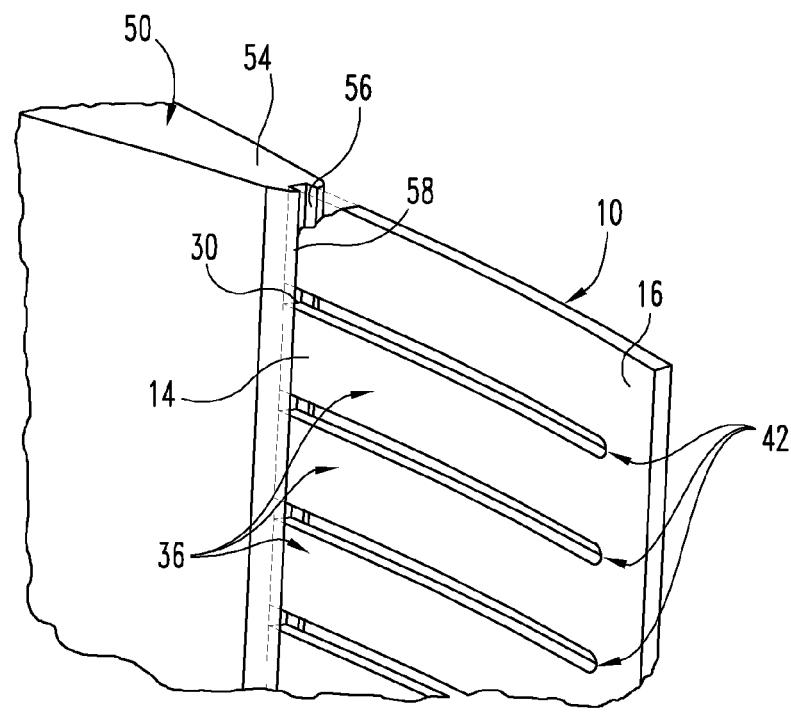
FIG. 2 is a partial perspective view of a delivery member associated with the method.

Referring now to FIG. 2, the cooling channel preform 10 is coupled to a delivery member 50. In one form, the forward end 14 of the cooling channel preform 10 is configured to engage a trailing end 54 of the delivery member 50. In another form, the forward end 14 of the cooling channel preform 10 is sealed against the trailing end 54 of the delivery member 50. The delivery member 50 is formed based on the particular requirements of the finished CMC airfoil 80. The delivery member 50 can comprise any suitable system that can deliver cooling fluid to the slots 42 of the finished CMC airfoil 80. Thus, for example, in the FIG. 2 embodiment, the delivery member 50 comprises a CMC foam material. In another form, the delivery member 50 can comprise a removable core pin. The delivery member 50 can be formed for example during a subsequent layup manufacturing process. Other forms are also contemplated, as will be appreciated. In one form, for example, the delivery member 50 can be configured and/or shaped so as to control one or more of the pressure, velocity and/or temperature of the cooling fluid entering the slots 42.

The delivery member 50 has a configuration and/or shape that can allow the receipt of the forward end 14 of the cooling channel preform 10 and/or that can seal against the forward end 14 of the cooling channel preform 10 in a flush manner. In the FIG. 2 embodiment, for example, the CMC foam material 50 is shaped to have a groove 56 in its trailing edge 58 that can receive the forward edge 30 of the cooling channel preform 10. As such, the forward edge 30 of the flow separator members 36 protrudes into and is thus captured in the trailing edge 58 of the delivery member 50. In one form, the protrusion of the cooling channel preform 10 into the delivery member 50, or the flush sealing of the cooling channel preform 10 in abutting relation with the delivery member 50, can inhibit or prevent matrix material applied in a subsequent composite manufacturing process from inadvertently sealing or otherwise blocking the slots 42.

Figure 3:
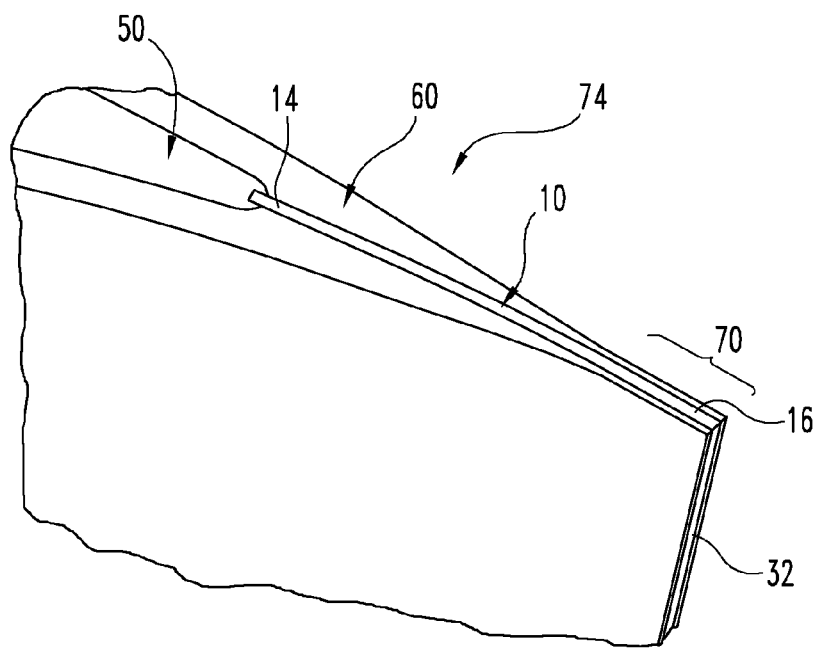
FIG. 3. is a partial perspective view of a CMC cover associated with the method.

Referring now to FIG. 3, a ceramic matrix composite (CMC) cover 60 is applied to the delivery member 50 and the cooling channel preform 10. The CMC cover 60 can comprise any suitable airfoil core, wrap plies, or matrix material, for example, fabric, tape, and/or ceramic fibers, and any suitable manufacturing process can be employed. In one form, for example, the material matrix is applied by a layup manufacturing process. Further, the CMC cover 60 can take any suitable shape and thickness, and can be applied in any suitable order and/or location that produces the desired CMC airfoil shape upon consolidation/solidification. FIG. 3 shows one non-limiting example of a CMC cover 60 of airfoil core and wrap plies. In the FIG. 3 embodiment, the CMC cover 60 extends over the length or chordwise extent of the cooling channel preform 10 so as to at least encapsulate the slots 42.

Figure 4:
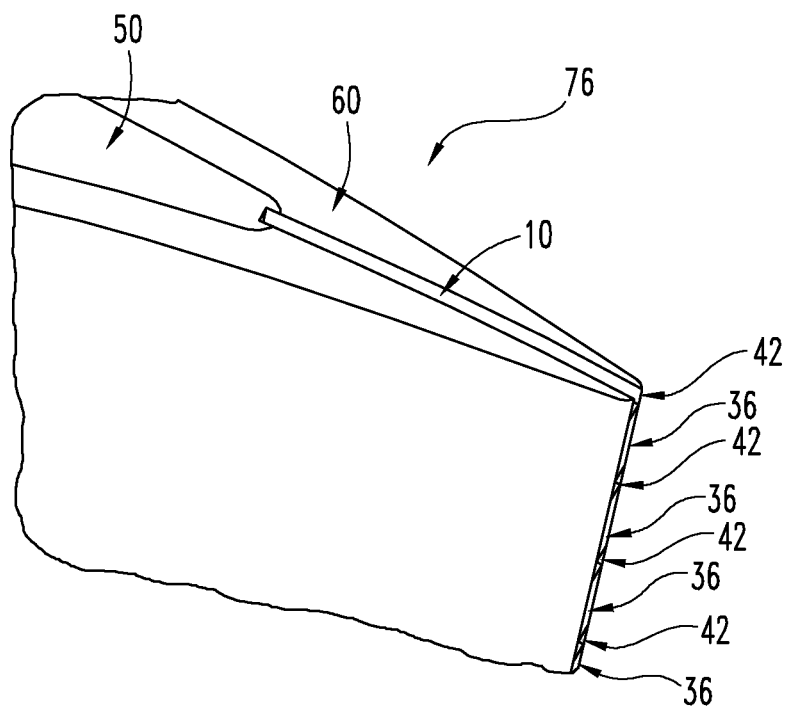
FIG. 4 is a partial perspective view of a trimmed consolidated product associated with the method.

The CMC cover 60, the delivery member 50, and the cooling channel preform 10 are then consolidated. Once consolidated, the delivery member 50 comprises a CMC foam delivery member. In another form, for example in the case of a removable core type delivery member, the delivery member 50 can comprise a cavity. In another form, the delivery member 50 can comprise, in part, a CMC foam and, in part, a cavity. The trailing end 70 of the consolidated product 74 is trimmed to length and shaped, exposing the slot cooling passages 42. The trimming can be by any suitable manufacturing technique, such as by machining, cutting, etc. FIG. 4 shows an example of a trimmed consolidated product 76. The trimming can be at any location along the chordwise dimension of the consolidated product 74 to expose the encapsulated slots 42. Shaping of the consolidated product 74 can be performed prior or subsequent to the trimming.

Figure 6:
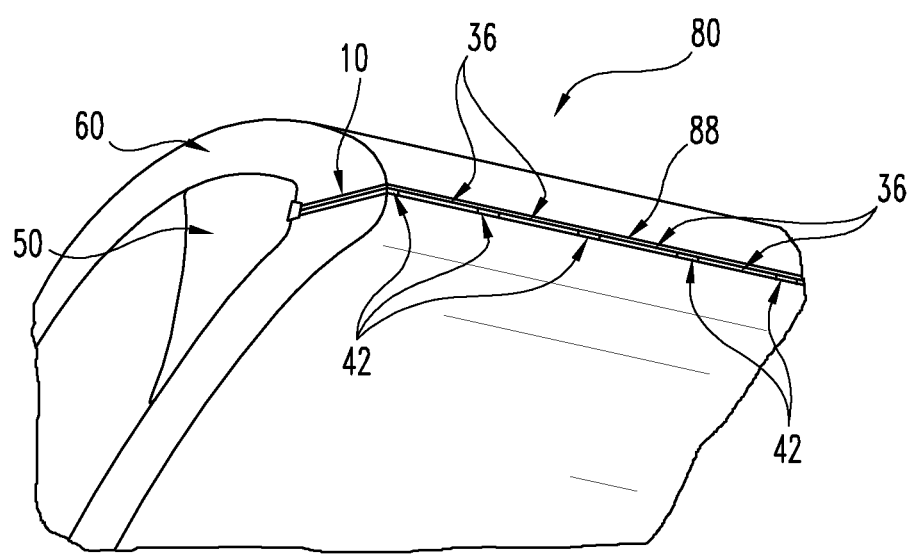
FIG. 6 is a partial perspective view of the FIG. 5 finished CMC airfoil as viewed from a trailing edge thereof.

FIG. 5 shows an example of the finished CMC airfoil 80 in which the pressure side portion of the CMC cover 60 has been made see-through to show the underlying slots 42. In FIG. 5, cooling fluid represented by arrows 82 passes through the CMC foam (or cavity) 50, enters the slot cooling passages 42, and exits the trailing edge 88 of the CMC airfoil 80, providing cooling to the CMC airfoil 80. FIG. 6 shows a trailing edge 88 view of the CMC airfoil 80.

Any theory, mechanism of operation, proof, or finding stated herein is meant to further enhance understanding of embodiment of the present invention and is not intended to make the present invention in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

What is claimed is:

1. A method comprising:
    fabricating an airfoil preform having a slotted forward end and a continuous trailing end;
    coupling the slotted forward end of the airfoil preform to an airfoil core insert;
    applying a ceramic matrix composite covering to cover the slots of the airfoil preform; and
    removing the continuous trailing end of the airfoil preform to expose the slots;
    wherein:
    the fabricating step comprises providing a cooling passage preform having a spanwise extending trailing end portion and a plurality of flow dividing members projecting from the spanwise extending trailing end portion that define cooling passages therebetween;
    the coupling step comprises coupling a cooling delivery core to a forward end of the cooling passage preform to close a forward end of the cooling passages;
    the applying step comprises covering the cooling passages with a ceramic matrix material; and
    the removing step comprises trimming the spanwise extending trailing end portion of the cooling passage preform to expose the cooling passages.

2. The method of claim 1 in which the airfoil preform comprises a monolithic ceramic.

3. The method of claim 1 in which the slots are substantially perpendicular to the continuous trailing end of the airfoil preform.

4. The method of claim 1 in which the slots extend through the thickness of the airfoil preform.

5. The method of claim 1 in which the slots are formed by machining material from the airfoil preform.

6. The method of claim 1 in which the coupling comprises capturing the slotted forward end of the airfoil preform in a spanwise groove in the trailing end of the airfoil core insert.

7. The method of claim 1 in which adjacent ones of the plurality of flow dividing members define cooling passages therebetween that have a substantially linear configuration in the chordwise direction.

8. The method of claim 1 in which the cooling passages are substantially the same size.

9. The method of claim 1 in which the cooling passages are equally spaced apart in the spanwise direction.

10. The method of claim 1 in which the cooling passages have a substantially uniform width.

11. A method comprising:
    fabricating an airfoil preform as a cooling passage preform having a spanwise extending trailing end portion and a plurality of flow dividing members projecting from the spanwise extending trailing end portion towards a forward end and defining cooling passages therebetween;
    coupling a cooling delivery core to the forward end of the cooling passage preform to close a forward end of the cooling passages;
    covering the cooling passages with a ceramic matrix material; and
    trimming the spanwise extending trailing end portion of the cooling passage preform to expose the cooling passages.

12. The method of claim 11, wherein the airfoil preform comprises a monolithic ceramic.

13. The method of claim 11, wherein the cooling passages are substantially perpendicular to the trailing end portion of the airfoil preform.

14. The method of claim 11, wherein the cooling passages extend as slots through the thickness of the airfoil preform.

15. The method of claim 11, wherein the cooling passages are formed by machining material from the airfoil preform.

16. The method of claim 11, wherein the coupling comprises capturing the forward end of the airfoil preform in a spanwise groove of the cooling delivery core.

17. The method of claim 11, wherein the plurality of flow dividing members are substantially linear in the chordwise direction.

18. The method of claim 11, wherein the cooling passages are substantially the same size.

19. The method of claim 11, wherein the cooling passages are equally spaced apart.

20. The method of claim 11, wherein the cooling delivery core is formed as at least a portion of an airfoil core insert.

* * * * *